(No Model.)
C. SCHLICKEYSEN.
COUPLING FOR PULLEYS.
No. 490,313. Patented Jan. 24, 1893.
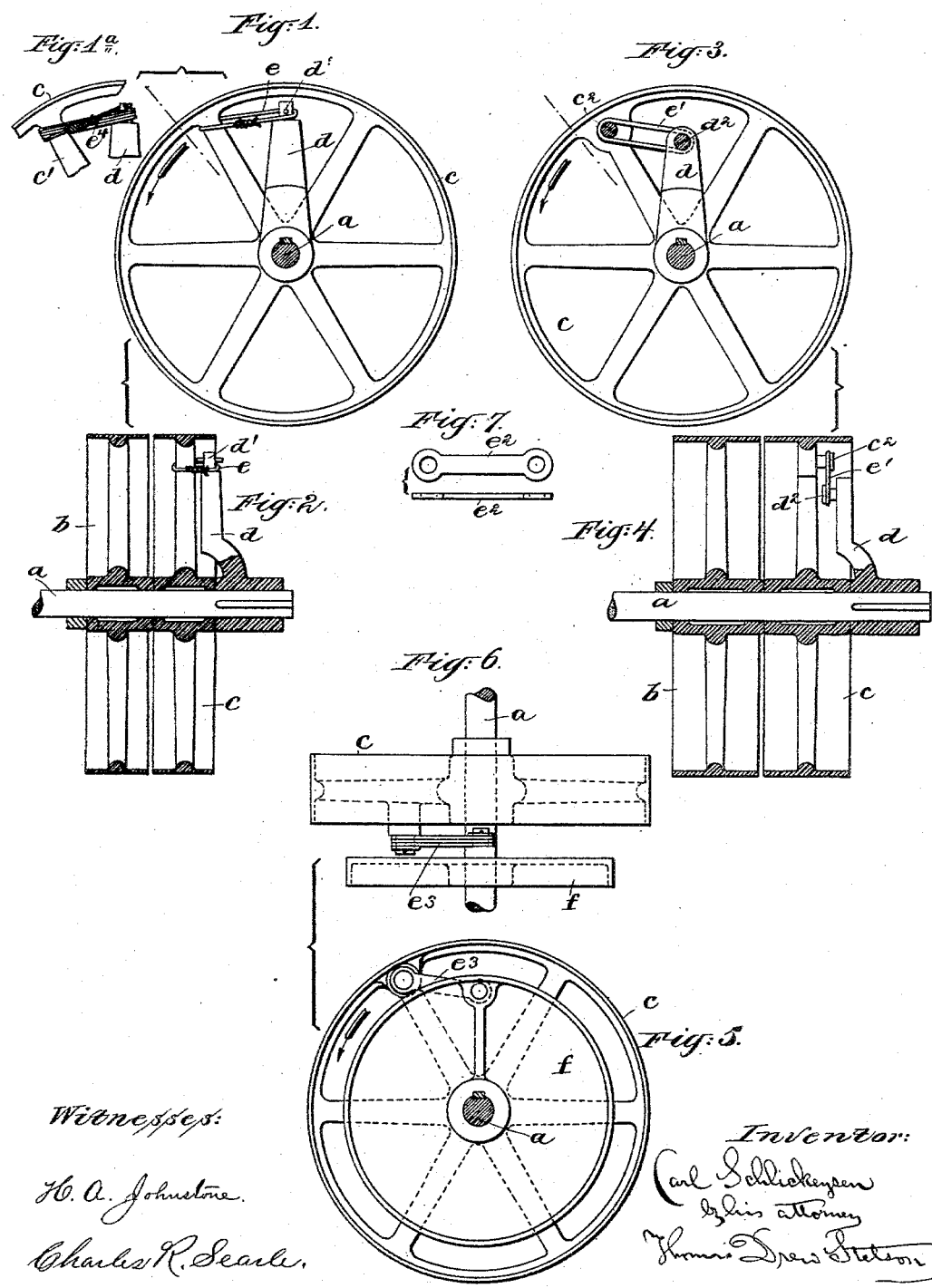

UNITED STATES PATENT OFFICE.

CARL SCHLICKEYSEN, OF BERLIN, GERMANY.

COUPLING FOR PULLEYS.

SPECIFICATION forming part of Letters Patent No. 490,313, dated January 24, 1893.

Application filed September 1, 1892. Serial No. 444,781. (No model.)

*To all whom it may concern:*

Be it known that I, CARL SCHLICKEYSEN, a subject of the Emperor of Germany, residing at Berlin, Prussia, Germany, have invented a certain new and useful Improvement in Couplings for Pulleys; and I do hereby declare that the following is a full and exact description thereof.

The invention has for its object to provide a cheap and easily replaced coupling which will break when the machine is too greatly strained and thereby avert the greater evil, the breaking of the more expensive parts of the machine. For obtaining this object the power-transmitting pulley is fitted loosely on the shaft and united by means of a cheaply made connection which I will term a link, with a stout part, as an arm, strongly fastened on the shaft. The cross-section of this link is so small that it will break when a certain traction power is exceeded. Upon this occurring the pulley will run loosely on the shaft, and will not again transmit power to the working machine until it has been repaired or a new link supplied. A spare link may be kept in readiness to be supplied, and a re-fitting of my machine after a breakage from over-straining, is very easily and rapidly accomplished.

The accompanying drawings form a part of this specification and represent what I consider the best means of carrying out the invention.

Figure 1 is a side elevation of the main part with a cross-section of the shaft. Fig. 1ª is a side elevation of a portion corresponding to the form shown in Fig. 1, with a modification. Fig. 2 is a longitudinal section. The main portion of the arm fixed on the shaft is in elevation. The remaining figures show modifications. Fig. 3 is a side elevation and Fig. 4 a corresponding longitudinal section showing a modification. Fig. 5 is a side elevation and Fig. 6 a corresponding plan view showing another modification. Fig. 7 gives two views of another form of the link detached.

Similar letters of reference indicate corresponding parts in all the figures where they appear.

Referring to Figs. 1 and 2, on the main shaft $a$ are placed two pulleys $b$ and $c$. The pulley $b$ is intended to remain always loose, and to perform the usual duties of a loose pulley in carrying the driving belt idly when required. Near the pulley $c$ an arm $d$ is strongly and rigidly fixed on the shaft. The pulley $c$ and arm $d$ are united together by an obliquely mounted coupling-piece $e$ of moderate strength, which I term a link, by means of which, when the pulley rotates in the direction of the arrow, under all ordinary and proper strains, the arm $d$ and consequently the shaft $a$ will be rotated in the same direction. The coupling link will thus be used for traction, or for being broken. Its resistance will depend on its cross-section, and on the material of which it is made, and may easily be adapted to the maximum working force to be transmitted to the shaft $a$. If, from any cause this strain is exceeded, then the link $a$ connecting to the arm $d$, will break, and the shart $a$ being deprived of its driving force will stop and the destruction of any other part of the machine will be avoided.

The coupling or link $e$ may consist of a loop or elongated coil of wire, as shown by two examples in Fig. 1. The loop may at one point be secured to a part on the pulley, for example, extending directly around an arm $c'$ thereof, and at the other end secured around a reduced portion $d'$ of the arm $d$ fixed on the shaft. The wire-ends may be twisted or in any other way joined reliably together. By the number of coils in the wire link the strain may be determined which is to be transmitted through the machine.

Figs. 3 and 4 show a coupling in the form of an oblong ring or link $e'$ which at one end engages with a pin $c^2$ set in an arm of the pulley and at the other end with a pin $d^2$ set in the arm $d$ keyed on the shaft. Instead of such a link there may be provided, as shown in Figs. 5, 6 and 7, a link $e^2$ or $e^3$ which may consist of a flat rod of a determined cross-section, or of a piece of sheet-metal. There may be several thin parts $e^3$ applied side by side, each with an eye in each end: This last construction offers the advantage that by taking off or adding parts the link may be made of different resistances, and thus there may be determined exactly the working strain which is not to be exceeded.

In Figs. 5 and 6, instead of an arm $d$, there is shown a pulley $f$ solidly keyed on the shaft $a$, which arrangement offers a greater security against accidents than does the arm $d$.

Other modifications may be made. Instead of the strain on the link or coupling $e$ being tensional, it may be a thrusting strain, in which case it will be arranged behind instead of before the arm $d$. In general the breaking link stands oblique, with one end secured to the power-transmitting pulley, and the other secured to a part fastened solidly to the shaft and rotating with the same, as for example, a cog-wheel, an arm or a wheel. The oblique or inclined position of the link allows the strain to be transmitted successfully so long as the link endures, while the pin in the arm is so much out of the path of the pin or other portion of the pulley to which the link is attached, that they pass each other without contact when, as will often occur, one part continues to revolve after the other has stopped.

In Fig. 1$^a$ the link is marked $e^4$.

In the form shown in Figs. 1, 1$^a$ and 2, the inclination is in the direction longitudinal to the shaft. After the rupture of the link the pin $d'$ will pass the arm $c'$, to which the link has previously attached it, without contact, by reason of the fact that the arm $d$ and its pin $d'$ travel in a path which is out of the plane of the travel of the arm $c'$.

In the arrangement shown in Figs. 3 and 4, and also in that shown in Figs. 5, and 6, the obliquity is in the direction radially to the pulleys, one pin passing within or nearer the axis of motion than the other. The word "incline" applies to both these classes of relations.

I claim as my invention:

The combination of the pulley, the arm and the inclined, breakable link connecting said arm and pulley, adapted to serve substantially as herein specified.

In testimony whereof I have hereunto set my hand, at Berlin, this 29th day of July, 1892, in the presence of two subscribing witnesses.

CARL SCHLICKEYSEN.

Witnesses:
L. A. EDWARDS,
W. HAUPT.